April 10, 1928.
N. A. OSCHER
STRESS BREAKER
Filed March 12, 1926
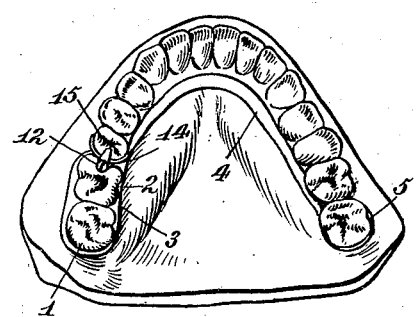
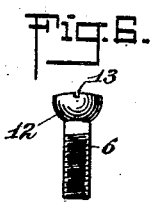
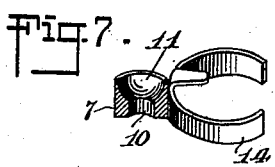
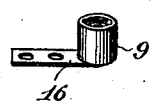
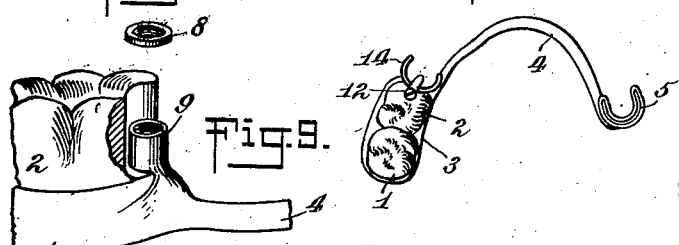
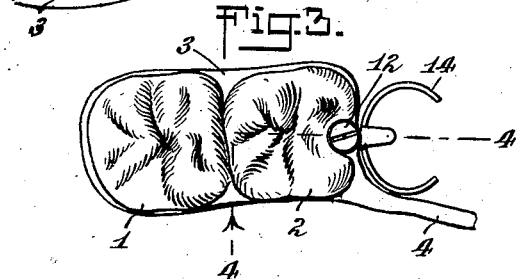
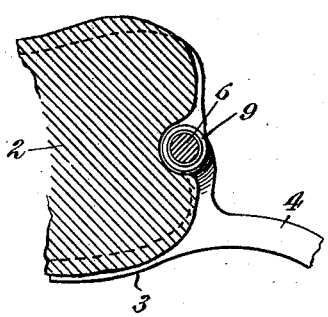
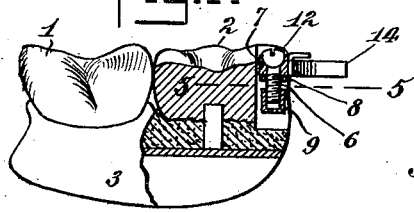
WITNESSES
INVENTOR
Nathan A. Oscher
BY
ATTORNEYS Patented Apr. 10, 1928.

1,665,975

UNITED STATES PATENT OFFICE.

NATHAN A. OSCHER, OF BROOKLYN, NEW YORK.

STRESS BREAKER.

Application filed March 12, 1926. Serial No. 94,266.

This invention relates to stress breakers and more particularly to a stress breaker or stress eliminator, which is adapted for use in connection with partial dentures, an object of the invention being to provide a coupling device of this nature which connects a tooth engaging member with the artificial denture and which compensates for the natural movement of the teeth.

I am aware of course that devices of a similar nature have been devised which permit lateral movement and vertical adjustment, but my improved coupling in addition to these operations has in a very real sense a ball and socket connection which permits of a turning or partial rotary movement of a tooth, which is the natural movement, and I am enabled to vary this movement by adjustment after the denture is completed.

A further object is to provide a stress breaker which is capable of adjustment to give the desired pressure on the gums or membranes and which can be nicely adjusted after shrinkage of the gums by the employment of a screw driver without the necessity of mechanically changing or altering the denture or the clamp for engaging a good tooth.

I would have it distinctly understood that my improved device is adatped for use in connection with any form of partial denture, and I do not wish to limit myself in any sense to any particular form of partial denture but desire to cover the device per se for any use to which it can be put.

A further important object of my invention is to provide a device of the character stated which will be entirely sanitary, which can be readily cleaned so that food particles can be easily removed, and which may be fixed to and constitute a part of a denture, and which will most efficiently perform the functions for which it is intended.

With these and other objects in view, my invention consists in certain novel features of construction and combinations and arrangements of parts, which will be more fully hereinafter described and pointed out in the claims.

I illustrate in the accompanying drawings my invention as applied to one type of partial denture, and in said drawings—

Figure 1 is a plan view, showing my device in operative position;

Figure 2 is a plan view of the denture removed from the jaw;

Figure 3 is an enlarged fragmentary plan view of the partial denture shown in Figure 2;

Figure 4 is a fragmentary view in section on the line 4—4 of Figure 3;

Figure 5 is a view in transverse horizontal section on the line 5—5 of Figure 4;

Figures 6, 7, 8 and 9 are detail views illustrating four parts which go to make up my improved stress breaker;

Figure 10 is a perspective view, illustrating a modification.

I have selected for illustration a partial denture in which two artificial molars 1 and 2 are secured to a base 3 which may be of metal or any other suitable material, and which is fixed to a bar 4 having a clamp 5 at one end to clamp around a good tooth of the jaw. This form of denture is for illustration only as it is obvious that my device may be used in connection with any form of partial denture.

First, I shall describe the construction mechanically of my improved device, and then point out its use and operation.

My improved device comprises four separate and distinct parts, namely, a screw 6, a sleeve 7, a nut 8, and a tubular socket member 9, the latter being internally screw-threaded to receive the threaded lower end of the screw 6.

The sleeve 7 has a bore 10 therein slightly larger in diameter than the diameter of the screw 6, and the upper end of said sleeve 7 is recessed to form a socket 11 to receive the semi-spherical head 12 of the upper end of the screw 6 and give a ball and socket connection between the sleeve and the screw. The head 12 has a screw driven receiving groove 13 therein so that it may be adjusted for a purpose which will hereinafter appear.

The nut 8 is preferably in the form of a metal ring having internal threads and adapted to be adjusted toward and away from the lower end of the sleeve 7 to give the desired freedom of movement between the screw and the sleeve.

The tubular socket member 9 is preferably closed at its lower end, as shown at Figure 4, so as to prevent the entrance of food particles therein.

The sleeve 7 carries a clamp 14, preferably of the three-prong type, illustrated to removably engage a good tooth 15 in the jaw, and while I shall refer to this part 14 as a clamp I would have it distinctly understood that the sleeve may be fixed to any part or member which will effectually engage and securely couple with a tooth; and I do not wish to be limited to any particular form of clamp or other means for the purpose.

The tubular socket member 9 is soldered or otherwise secured to the base 3 of the denture, and the artificial molar 2 is cut out or grooved in its forward face to accommodate the socket member and also to accommodate the other parts of my improved device so as to allow the artificial teeth to fit close to the good tooth and prevent any undue space between. With my improved device it is necessary to remove but a relatively small portion of the artificial tooth as compared with other devices of which I am aware. Hence, I have been able to provide very strong and durable artificial teeth without the weakening of the same to accommodate a coupling device.

If a socket member is to be secured to a rubber or other analogous base, I may use an anchoring strip 16 fixed to the socket member 9, as illustrated in the modification shown in Figure 10. This anchoring strip 16 can be molded or otherwise formed in the base in any approved manner.

I shall not attempt to set forth in detail the exact manner of carrying out the construction of a denture with my improved device, as this is capable of modification, but I would have it understood that the socket member 9 is secured properly to the base 3 and ample accommodation provided for the nut 8 and sleeve 7 above the same with the screw 6 in place, the entire assemblage appearing as shown in Figure 4.

When the parts are thus assembled and there is a shrinkage of the gums it is simply necessary for the dentist to adjust the screw 6 longitudinally in the tubular socket member 9, and this can be done by the employment of a screw driver imparting turning movement to the screw. When the parts are coupled, the ball and socket joint between the head 12 and the sleeve 7 allow for lateral tilting or pivotal movement; the position of the nut 8 allows for the desired vertical movement of the sleeve relative to the screw and vice versa; and the mounting as a whole permits of a turning or pivotal movement so that the joint is in a very real sense a universal joint which prevents undue strain upon the good tooth due to the action of the jaws in performing their natural functions of mastication.

It is this coupling device which I desire to cover broadly in this patent, and I do not wish to restrict myself to any particular partial denture, to any particular means for assemblage of the parts, nor to any unnecessary adjuncts or features which co-operate therewith, but desire to cover broadly the device which consists of the screw, the sleeve, the socket member, and the nut arranged substantially as set forth and designed for the purpose intended. Hence, various slight changes and alterations might be made in the general form of the parts described without departing from my invention and, therefore, I do not limit myself to the precise details set forth but consider myself at liberty to make such slight changes and alterations as fairly fall within the spirit and scope of the appended claims.

I claim:

1. A device of the character described, including a sleeve, a screw having a ball and socket connection with the sleeve, a threaded socket member adapted to be connected to a partial denture and receive the screw, said sleeve adapted to support a tooth engaging member, and a nut on the screw placed gingivally of the sleeve adapted to adjust the engagement between the screw and the sleeve.

2. A device of the character described, including a sleeve adapted to be secured to a tooth engaging member, said sleeve having a bore therethrough and a socket therein, an internally screw-threaded socket member adapted to be fixed to a partial denture, a screw projected through the bore of the sleeve and having a head fitting the socket, said head having a screw driver receiving groove in its outer end, and a nut adjustable on the screw on the gingival side of the sleeve.

3. The combination with a partial denture of an internally screw-threaded socket member having a closed end and fixed to the base of the partial denture, a tooth of said partial denture being grooved to accommodate the socket member, a tooth engaging clamp, a sleeve fixed to the clamp, a screw projected through the sleeve and adjustable in the socket member, said screw having a ball and socket juncture with the sleeve, and a nut on the screw on the gingival side of the sleeve adapted to vary the engagement of the screw and the sleeve.

NATHAN A. OSCHER.